Patented Nov. 1, 1938

2,135,358

UNITED STATES PATENT OFFICE 2,135,358

PROCESS FOR SULPHONATING AND SULPHATING OLEFINES

Chester Merle Suter, Evanston, Ill., assignor to The Procter & Gamble Company, Cincinnati, Ohio, a corporation of Ohio No Drawing. Application April 15, 1937,
Serial No. 137,041

10 Claims. (Cl. 260—99.12)

This application is a continuation in part of my co-pending application Serial No. 45,505, filed October 17, 1935, entitled "Process for sulphonating organic compounds", which has matured into Patent No. 2,098,114, filed November 2, 1937.

This invention relates to a new process of forming sulphuric reaction products by treatment of olefines with a new sulphonating reagent, namely, the addition product of sulphur trioxide with dioxane. The term sulphuric reaction products as used herein includes sulphuric esters and sulphonic acids.

It is an object of my invention to develop an improved process of making the sulphuric reaction products of unsaturated aliphatic hydrocarbons, or other compounds, having an olefine linkage.

Another object is to produce these compounds in a purer condition than has hitherto been practicable.

Another object is to produce from unsaturated compounds having an olefine linkage, sulphuric reaction products having wetting and detergent properties.

It is already known that 1,4-dioxane reacts with ordinary concentrated sulphuric acid to form an oxonium salt with the composition $O(CH_2CH_2)_2O.H_2SO_4$. I have found that sulphur trioxide reacts with 1,4-dioxane to form a coordination compound which is not an oxonium salt but the anhydride of same. Furthermore, 1,4-dioxane can add two molecules of the sulphur trioxide but only one molecule of sulphuric acid. The reaction between sulphur trioxide and 1,4-dioxane occurs in two stages which are represented by the following equations:

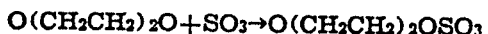

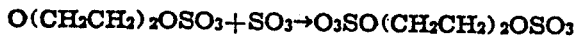

The amount of sulphur trioxide present in the two products above, or a mixture of same, will vary between about 47 and 65 per cent. These products are characterized by decomposition with water to form sulphuric acid and 1,4-dioxane, and by lack of stability toward heat; they decompose without melting when kept at a temperature of about 60 to 70° C. These compounds with sulphur trioxide have not previously been known as far as I am aware. I have, furthermore, found that either of these sulphur trioxide compounds, or a mixture of the two in any proportions, is useful as a sulphating and sulphonating agent, which discovery is also new as far as I am aware, and offers many advantages as hereinafter set forth.

In the prior art, unsaturated compounds having an olefine linkage have been converted to sulphonic acids by treating same with sulphuric acid, or chlorsulphonic acid, or indirectly by the well known Strecker reaction. Such reagents as sulphuric acid, chlorsulphonic acid, etc., are commonly referred to as "sulphonating agents", regardless of whether they are used to form true sulphonic acids or to form sulphuric esters, and I have employed this term with the same breadth of meaning in this specification. These procedures, however, frequently involve the production of certain by-products due to polymerization, charring, etc. My process of sulphating or sulphonating is substantially free from these objections.

I first prepare the sulphur trioxide addition product in the following manner, for example; to a solution of 5.4 parts of 1,4-dioxane in 75 parts of a suitable solvent such as carbon tetrachloride is added 7.5 parts of sulphur trioxide. The sulphur trioxide may be added in any convenient manner, either as a solid, liquid, or vapor. A white sludge of the insoluble addition product appears in the reaction mixture. This mixture is employed without further treatment either as a sulphating agent or as a true sulphonating reagent. Filtration of the mixture through a sintered glass filter yields the white solid reaction product which on analysis is found to contain about 55 per cent sulphur trioxide. In commercial work it is more economical to add more sulphur trioxide so that the amount of this in the addition product will approximate 65 per cent.

Besides sulphur trioxide itself, I find that certain other products may be used which contain sulphur trioxide in a loosely bound form from which it is readily liberated when treated with dioxane. Fuming sulphuric acid ("oleum", 60–80%) and chlorsulphonic acid, for example, are products of this class which form compounds with dioxane similar to that formed by sulphur trioxide but differing from that formed by ordinary sulphuric acid, and which act like the sulphur-trioxide-dioxane product in sulphation and sulphonation reactions. For this purpose the compounds containing sulphur trioxide in loosely bound form may be considered as equivalents for sulphur trioxide, and the several products although perhaps differing in some respects may be termed, together with the addition product of sulphur trioxide alone, as the addition product of sulphur trioxide with dioxane.

Various inert solvents for the sulphur-trioxidedioxane addition product may be used, such as carbon tetrachloride, carbon bisulfide, sym-tetrachloroethane, and ethylene dichloride.

The terms "suitable solvent" and "inert solvent" are used herein to denote solvents that dissolve both dioxane and the substance to be sulphonated or sulphated, and that do not react with the sulphonating reagent with sufficient rapidity to interfere with its use.

This sulphur trioxide addition product is useful in converting substances containing one or more olefine bonds into water-soluble sulphonic acids. Thus, reaction occurs readily with as diverse materials as propylene, amylene, heptadecene, other olefine hydrocarbons, and olive oil. This reaction occurs readily at room temperature, or preferably lower, without the undesirable side reactions such as polymerization and charring accompanying the use of other sulphonating agents. My reagent reacts with molecules which contain both hydroxy and olefine groups to produce compounds having both the sulphate ester and the sulphonic acid groups. In this case enough of the reagent should be used to react with both groups. This reaction occurs, for example, with oleyl alcohol, ricinoleic acid and castor oil.

The reaction which occurs at the double bond may be clearly illustrated in the case of propylene, as follows:

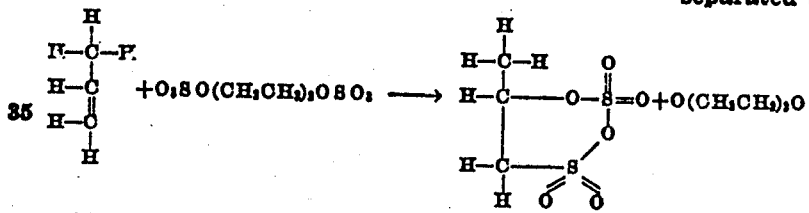

It is thus seen that a ring compound of six members results. That the structure of the propylene-sulphur-trioxide addition product is as shown instead of the alternative structure with the oxygen attached to the end carbon has been proven by a study of the products formed by hydrolysis and oxidation.

The product hydrolyzes rapidly in water, even at low temperatures, as follows:—

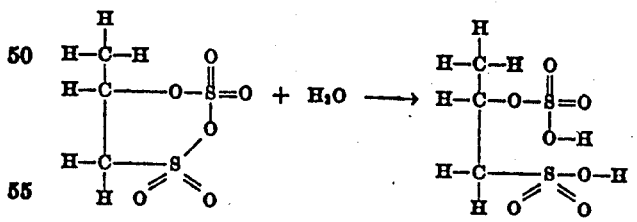

The compound thus formed contains both a sulphate and a sulphonate group, and when warmed in an alkaline solution for a short time reacts as follows:—

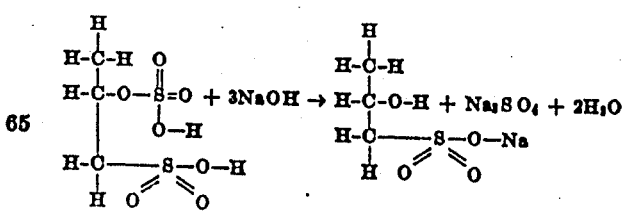

The resulting compound is thus a hydroxy sulphonate, and in general these products having from eight to twenty-two carbon atoms have good detergent properties, especially those containing from ten to about eighteen carbon atoms per molecule. The sulphate-sulphonate may be formed in this reaction at low temperatures, and these compounds also have fair detergent properties but hydrolyze quite readily in water.

Products of similar structure result with other compounds having an olefine linkage, whether this occurs at the end of the chain or elsewhere.

Olefines which have two alkyl groups on the same carbon atom, such as isobutylene for example, also react readily and apparently form compounds of similar structure to the above, but a certain amount of polymerization also appears to take place. Olefines suitable for this reaction include those occurring in natural petroleum and cracked petroleum, those produced by destructive distillation, and those produced synthetically.

Sulphonation of unsaturated aliphatic compounds having olefine linkages may be carried out in accordance with the two following examples:

*Example 1. Sulphonation of 2-pentene.*—To an ice cold mixture of 8 g. of sulphur trioxide and 4.4 g. of dioxane in 50 c. c. of carbon tetrachloride was added slowly with stirring 6 c. c. of 2-pentene dissolved in 25 c. c. of the same solvent. Reaction was instantaneous. After filtering from a slight flocculent precipitate, the clear filtrate was treated with water whereupon a separation into two layers occurred with an evolution of heat. The aqueous acid layer was separated and neutralized with sodium hydroxide and evaporated to dryness. The resulting product was a mixture of a water-soluble sodium salt of the sulphuric reaction product of 2-pentene and sodium sulphate from which the former was separated by means of its solubility in alcohol.

*Example 2. Sulphonation of olive oil.*—To a solution of 10 c. c. of dioxane in 40 c. c. of ethylene dichloride kept in ice was added with stirring 13.3 g. of 60% oleum. The mixed addition products of dioxane-sulphur trioxide and dioxane sulfate separated out gradually, chiefly upon the walls of the reaction flask. To this mixture kept at about 10° C. was added with shaking a solution of 15 g. of olive oil in 25 c. c. of carbon tetrachloride. The reaction mixture became somewhat green in appearance. After standing for 15 minutes the unchanged dioxane hydrogen sulphate (only the sulphur trioxide addition products react appreciably under these conditions) was filtered off and the filtrate treated with 10 c. c. of concentrated (12.5 molar) sodium hydroxide. The reaction mixture became light yellow and upon standing deposited a reddish yellow precipitate. Upon treating with 50 c. c. of water most of this dissolved leaving a small amount of low melting insoluble material which was removed from the aqueous solution by filtration. The sodium salts of the sulphuric reaction product in the aqueous solution had soap-like properties.

*Example 3. Sulphonation of cetene, $(C_{16}H_{32})$.*— A reagent was prepared by adding 28 c. c. of 60% oleum to a solution of 50 c. c. of dioxane in 200 c. c. ethylene chloride. To this was added at 20–25° 42 grams of cetene. The mixture was added to a hot solution of 40 grams of sodium hydroxide in 200 c. c. of water which neutralized and hydrolyzed the product to the hydroxy sulphonate. The two layers separated very slowly and then a solid sodium salt separated out. This was dried on a porous plate at room temperature.

A small sample was recrystallized by dissolving in hot water and cooling the solution; this solution was noticeably soap-like in behavior, foaming when it was heated to boiling. When this product was subjected to careful tests for detergency it was found to have approximately as good detergency as the well known sodium lauryl sulphate, which is recognized as a good and useful detergent.

*Example 4. Sulphonation of heptadecene, ($C_{17}H_{34}$).*—To a solution of 53 grams (0.6 mol) of dioxane in 200 c. c. of ethylene chloride was added with stirring 77 grams of sulphur trioxide, the temperature being kept at or below 15° C. with ice and alcohol. To this mixture was added 123 grams (0.5 mol) of 1-heptadecene (prepared from N-tetradecylmagnesium bromide and allyl bromide). After standing over night (30 minutes is usually sufficient at a temperature of 25 to 30° C.), the solution was decanted from a small amount of residue, believed to be mainly dioxane hydrogen sulphate, and added to a slight excess of aqueous sodium hydroxide solution. The mixture, containing some solid sodium hydroxy sulphonate, was added slowly to a flask heated on a steam bath, the solvents distilling readily. The residue was a sticky mass which was poured into a porcelain dish and allowed to stand at room temperature until dry. (An alternative procedure would be to distill off the solvent and dioxane before adding to hot aqueous sodium hydroxide solution and drying.) The hard lumps of light yellow product which resulted were then pulverized and consisted of sodium hydroxy sulphonate of heptadecene. This material had good sudsing and detergent properties.

The solubility of the hydroxy sulphonates of the various olefines is found to decrease with increase in molecular weight. The product made from heptadecene dissolves only slightly in cold water while those from lower homologs, such as that from tridecene for example, are much more soluble.

The reaction of the dioxane-sulphur trioxide reagent with higher molecular weight olefines of from eight to twenty-two carbon atoms occurs readily at 20–25° without more than a slight darkening. The addition products are all soluble in ethylene dichloride, facilitating separation from any dioxane hydrogen sulphate which may be present if the reagent has been made with fuming sulphuric acid or chlorsulphonic acid instead of sulphur trioxide. These addition products undergo little if any decomposition when the solvent and dioxane are removed by distillation under reduced pressure on the water bath at 60–70° C. Thus by decanting the reaction mixture from any dioxane hydrogen sulphate produced by the presence of sulphuric acid along with the sulphur trioxide in the fuming sulphuric acid employed in making the sulphonating agent and by removing the solvent-dioxane mixture by distillation, it is possible to recover the dioxane and solvent almost completely. Before the product has been changed or hydrolyzed by addition of water or alkali, it is a carbyl sulphate derivative which does not foam. This makes it advantageous to distill off the solvent and dioxane before adding to the aqueous sodium hydroxide solution.

The sulphuric reaction products thus formed from unsaturated aliphatic compounds originally containing olefine linkages can be neutralized with the hydroxide or carbonate of sodium or potassium, or other bases, and if desired can be hydrolyzed by continued heating in an aqueous alkaline solution to form the hydroxy sulphonate, and the soluble salts thus formed with compounds having about ten to about twenty-two carbon atoms in the molecule have good wetting, sudsing and detergent properties, especially when the double bond occurs at the end of the chain.

Having thus described a new and useful process for sulphating or sulphonating organic compounds, what I claim is:

1. The process of making sulphuric reaction products which comprises treating an olefine with the reaction product of sulphur trioxide with dioxane.

2. The process of making sulphuric reaction products which comprises treating an olefine with the reaction product of sulphur trioxide with dioxane in the presence of a suitable solvent.

3. The process of making sulphuric reaction products which comprises treating an olefine with the reaction product of sulphur trioxide with dioxane in the presence of carbon tetrachloride.

4. The process of making sulphuric reaction products which comprises treating an olefine with the reaction product of sulphur trioxide with dioxane in the presence of ethylene chloride.

5. The process of making a wetting, sudsing and detergent agent which comprises treating an olefine containing from about ten to about twenty-two carbon atoms per molecule with the reaction product of sulphur trioxide with dioxane and subsequently neutralizing the product with an aqueous solution of a base forming a soluble compound.

6. The process of making a wetting, sudsing and detergent agent which comprises treating an olefine containing from about ten to about twenty-two carbon atoms per molecule with the reaction product of sulphur trioxide with dioxane and subsequently neutralizing the product with an aqueous solution of an alkali.

7. The process of making a wetting, sudsing and detergent agent which comprises treating an olefine containing from about ten to about twenty-two carbon atoms per molecule with the reaction product of sulphur trioxide with dioxane, subsequently neutralizing the product with an aqueous solution of a base forming a soluble compound, and hydrolyzing by treating with an aqueous solution of said base.

8. The process of making a wetting, sudsing and detergent agent which comprises treating an olefine containing from about ten to about twenty-two carbon atoms per molecule with the reaction product of sulphur trioxide with dioxane, subsequently neutralizing the product with an aqueous solution of an alkali, and hydrolyzing by treating with an aqueous solution of an alkali.

9. The process of making a sulphuric reaction product which comprises treating an olefine occurring in natural petroleum with the reaction product of sulphur trioxide with dioxane.

10. The process of making a sulphuric reaction product which comprises treating an olefine occurring in cracked petroleum with the reaction product of sulphur trioxide with dioxane.

CHESTER MERLE SUTER.

CERTIFICATE OF CORRECTION.

Patent No. 2,135,358.                                    November 1, 193

CHESTER MERLE SUTER.

It is hereby certified that the above numbered patent was errone
issued to "The Procter & Gamble Company" whereas said patent should
been issued to the inventor, said "SUTER", as assignor of twenty-fiv
cent to The Procter & Gamble Company, of Cincinnati, Ohio, a corpor
of Ohio, as shown by the record of assignments in this office; and
the said Letters Patent should be read with this correction therein
the same may conform to the record of the case in the Patent Offic Signed and sealed this 20th day of December, A. D. 1938.

Henry Van Arsdale

(Seal)                                          Acting Commissioner of Pat